US006874823B2

(12) United States Patent
Viegener

(10) Patent No.: US 6,874,823 B2
(45) Date of Patent: Apr. 5, 2005

(54) CONNECTING PIECE AND CONNECTING ARRANGEMENT

(75) Inventor: Walter Viegener, Attendorn (DE)

(73) Assignee: Franz Viegener II GmbH & Co. KG, Attendorn (DE)

(*) Notice: Subject to any disclaimer, the term of this patent is extended or adjusted under 35 U.S.C. 154(b) by 0 days.

(21) Appl. No.: 10/430,418

(22) Filed: May 7, 2003

(65) Prior Publication Data

US 2004/0222632 A1 Nov. 11, 2004

(30) Foreign Application Priority Data

May 10, 2002 (DE) ........................... 202 07 313 U

(51) Int. Cl.7 ................................................ F16L 33/00

(52) U.S. Cl. ...................... 285/256; 285/242; 285/259; 285/382; 285/93; 29/508

(58) Field of Search ................................ 295/242, 256, 295/259, 382, 382.7; 29/508, 520; 285/222.1, 285/93

(56) References Cited

U.S. PATENT DOCUMENTS

| | | | | |
|---|---|---|---|---|
| 1,848,198 A | | 3/1932 | Reid | |
| 1,901,820 A | | 3/1933 | Parker | |
| 2,225,208 A | | 12/1940 | Crickmer | |
| 2,255,673 A | | 9/1941 | McDermott | |
| 2,341,164 A | | 2/1944 | Shimek | |
| 2,453,997 A | * | 11/1948 | MacWilliam | 285/256 |
| 2,738,992 A | | 3/1956 | Heisler | |
| 2,926,029 A | * | 2/1960 | St Clair et al. | 285/256 |
| 3,210,102 A | | 10/1965 | Joslin | |
| 3,245,699 A | * | 4/1966 | Peterman | 285/110 |
| 3,436,085 A | | 4/1969 | Polk | |
| 3,539,207 A | * | 11/1970 | Harris | 285/256 |
| 3,596,939 A | | 8/1971 | Gibson | |
| 3,632,141 A | | 1/1972 | Larsson | |
| 3,775,822 A | | 12/1973 | Forni | |
| 3,917,324 A | | 11/1975 | Wakatsuki et al. | |
| 3,947,944 A | | 4/1976 | Washington | |
| 3,979,130 A | | 9/1976 | Cowie | |
| 4,018,462 A | | 4/1977 | Saka | |
| 4,130,302 A | | 12/1978 | Mitchell et al. | |

(Continued)

FOREIGN PATENT DOCUMENTS

DE 1 243 477 12/1967

(Continued)

OTHER PUBLICATIONS

European Search Report dated Jul. 25, 2003.

*Primary Examiner*—James M. Hewitt
(74) *Attorney, Agent, or Firm*—Barnes & Thornburg LLP

(57) ABSTRACT

A connecting piece for establishing a connecting arrangement for a pipe which can be pressed together comprises a stub which can be inserted into a pipe. Profilings for the pressing-together with the pipe and a stop are on the stub. At least one radially projecting spacer is provided on the stub. The spacer defining a gap for forming a flow duct between the stub and the pipe. The spacer may have an interruption for forming part of the flow duct.

11 Claims, 4 Drawing Sheets

U.S. PATENT DOCUMENTS

| | | | | |
|---|---|---|---|---|
| 4,191,384 A | | 3/1980 | Svedberg | |
| 4,293,150 A | * | 10/1981 | Press | 285/222.4 |
| 4,344,461 A | | 8/1982 | Beune et al. | |
| 4,362,323 A | | 12/1982 | Lodder et al. | |
| 4,368,894 A | | 1/1983 | Parmann | |
| 4,574,444 A | * | 3/1986 | Humpolik | 29/890.043 |
| 4,576,403 A | | 3/1986 | Burkholder | |
| 4,606,559 A | | 8/1986 | Rammelsberg | |
| 4,819,974 A | | 4/1989 | Zeidler | |
| 4,834,430 A | | 5/1989 | Vassallo et al. | |
| 4,850,096 A | | 7/1989 | Gotoh et al. | |
| 4,850,621 A | | 7/1989 | Umehara | |
| 4,880,260 A | | 11/1989 | Gotoh et al. | |
| 4,902,049 A | | 2/1990 | Umehara | |
| 5,108,134 A | | 4/1992 | Irwin | |
| 5,358,012 A | * | 10/1994 | Kish | 138/109 |
| 5,378,023 A | | 1/1995 | Olbrich | |
| 5,484,174 A | | 1/1996 | Gotoh et al. | |
| 5,695,224 A | | 12/1997 | Grenier | |
| 5,722,702 A | | 3/1998 | Washburn | |
| 5,927,763 A | | 7/1999 | Mehr | |
| 6,099,045 A | * | 8/2000 | Pirona | 285/256 |
| 6,260,891 B1 | | 7/2001 | Foering et al. | |
| 6,340,181 B1 | | 1/2002 | Amatsutsu | |
| 6,427,309 B1 | | 8/2002 | Viegener | |
| 6,581,983 B1 | | 6/2003 | Viegener | |

FOREIGN PATENT DOCUMENTS

| | | | | |
|---|---|---|---|---|
| DE | 29706408 U1 | | 7/1997 | |
| DE | 19637688 | | 3/1998 | |
| DE | 19722935 C1 | | 7/1998 | |
| DE | 29813935 U1 | | 11/1998 | |
| DE | 299 01 935 U1 | | 2/1999 | |
| DE | 299 07 585 U1 | | 4/1999 | |
| DE | 29915400 U1 | | 1/2000 | |
| DE | 10007914 C1 | | 9/2001 | |
| DE | 20109548 U1 | * | 10/2002 | |
| EP | 0 161 864 A1 | * | 11/1985 | |
| EP | 0343395 A | | 11/1989 | |
| EP | 0343395 A1 | | 11/1989 | |
| EP | 0343395 A2 | | 11/1989 | |
| EP | 0343395 A3 | | 11/1989 | |
| EP | 0343395 B1 | | 11/1989 | |
| EP | 0870964 A1 | | 10/1998 | |
| EP | 1 265 019 A1 | | 12/2002 | |
| GB | 2177174 | | 1/1987 | |
| GB | 2 220 242 A | * | 1/1990 | |
| GB | 2234306 | | 1/1991 | |
| JP | 8-226582 1 A | | 9/1996 | |
| WO | WO/92 09840 A | | 1/1992 | |
| WO | WO/97 42440 | | 11/1997 | |
| WO | WO/98 11377 | | 3/1998 | |

* cited by examiner

Fig. 2
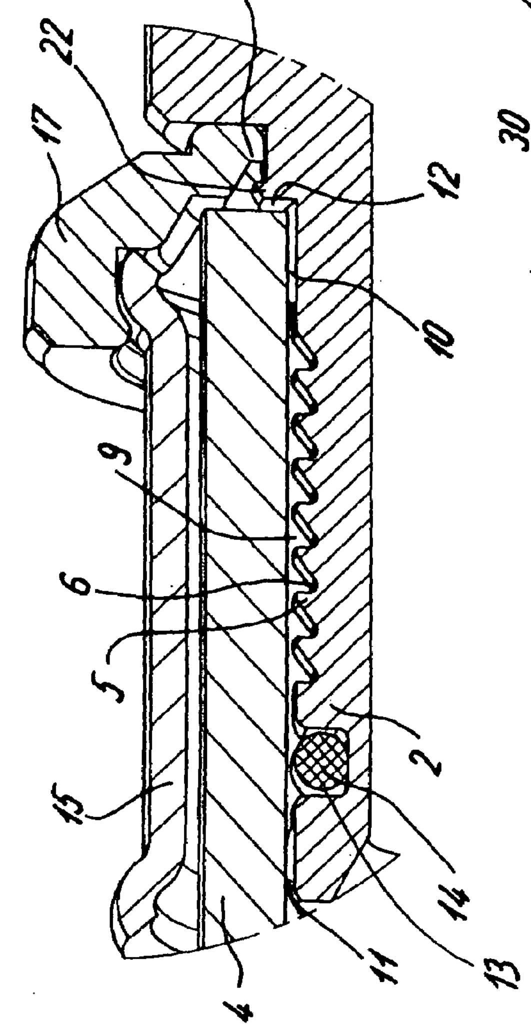
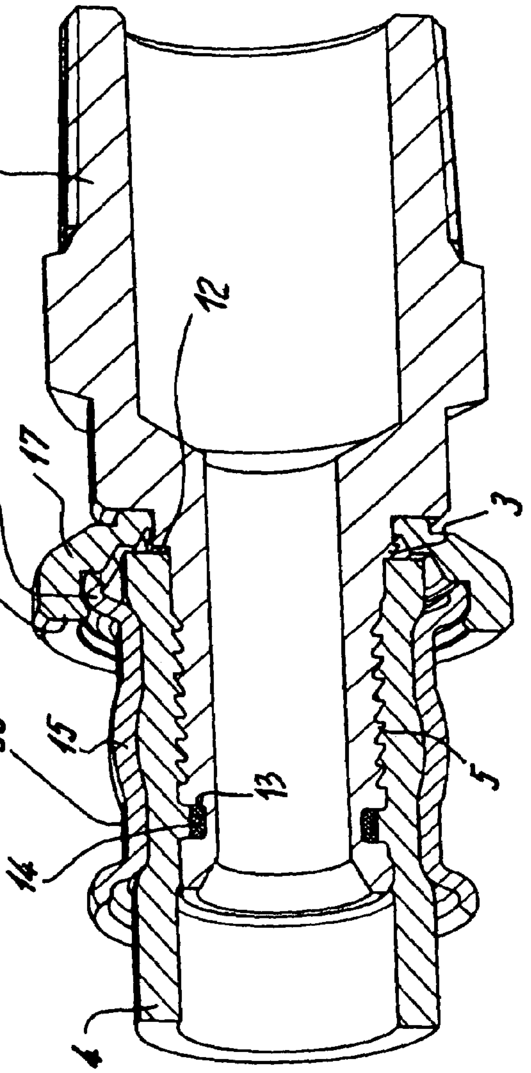
Fig. 3

Fig. 4
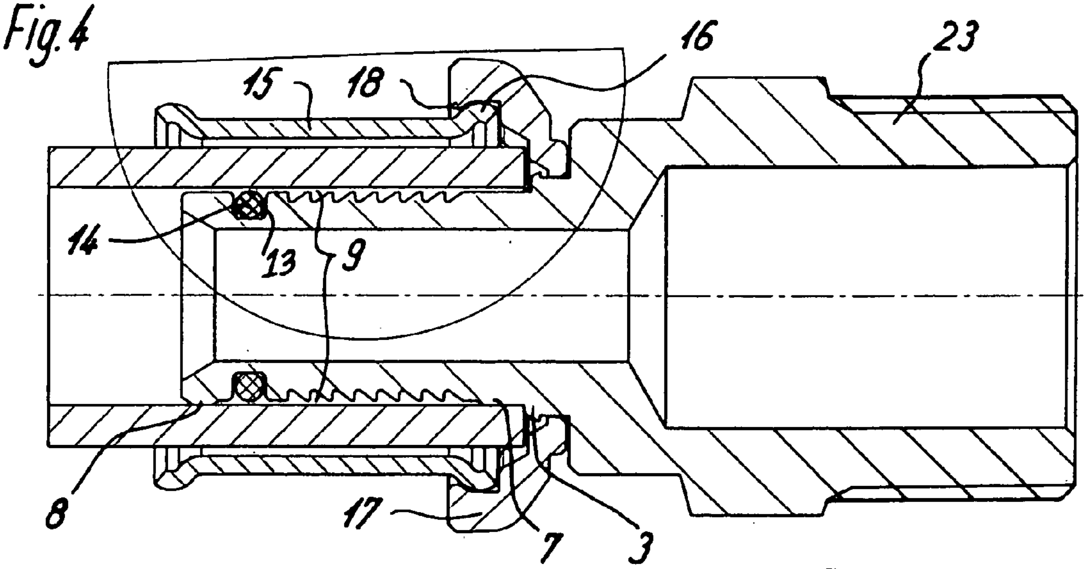
Fig. 5
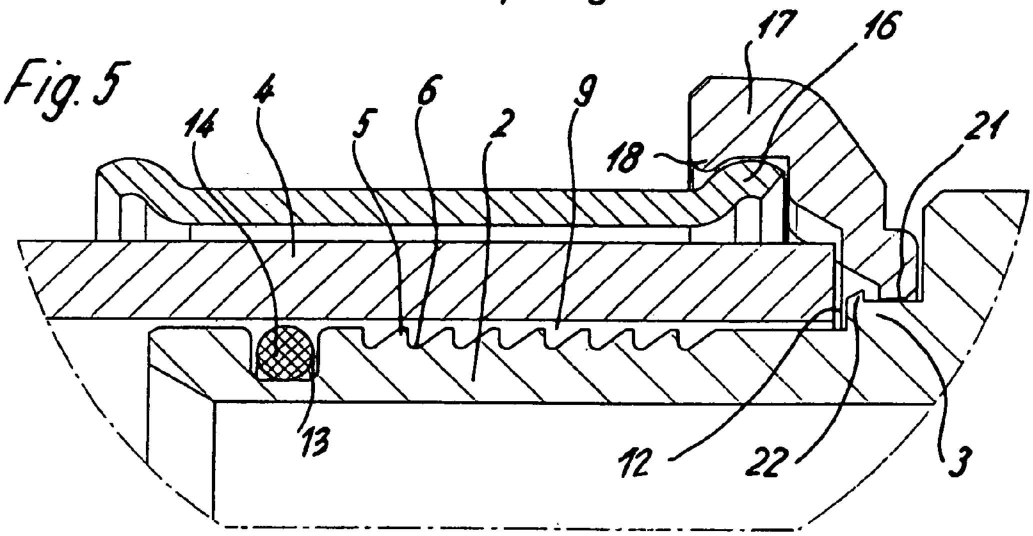
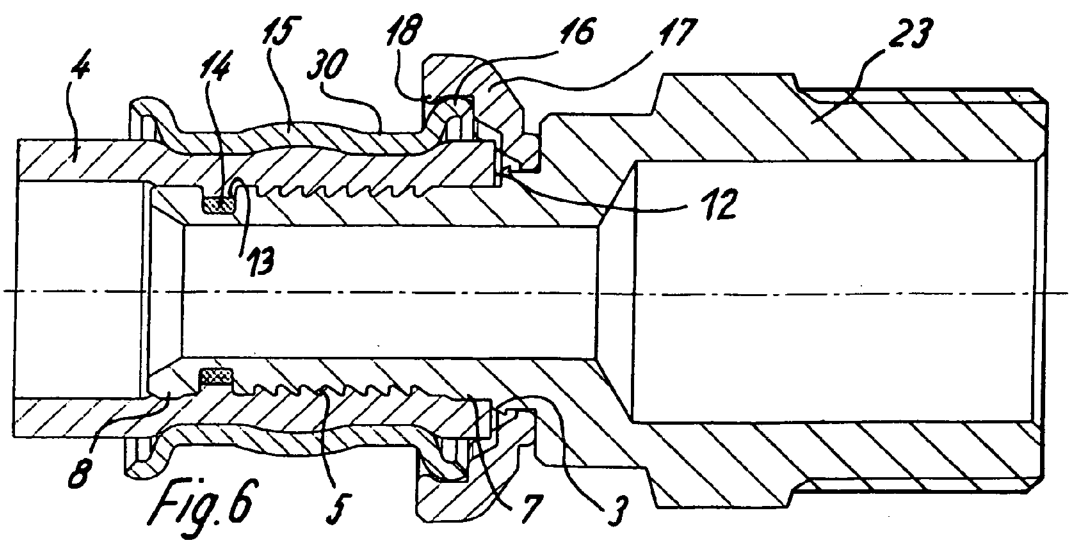
Fig. 6

CONNECTING PIECE AND CONNECTING ARRANGEMENT

BACKGROUND AND SUMMARY OF THE INVENTION

The present invention relates to a connecting piece for establishing a connecting arrangement which can be pressed together, having a stub which can be inserted into a pipe and on which profilings are provided for the pressing-together with the pipe and which can be pushed into the pipe to a stop.

In the prior art, supporting pipes constructed as a connecting piece were suggested, which supporting pipes are pushed into a pipe for establishing a pressed connection. For this purpose, the supporting pipe has a stub whose outer circumference corresponds approximately to the inner circumference of the pipe. For establishing a pressed connection, a pressure sleeve is placed around an end section of the stub and this pressure sleeve is then pressed onto the pipe so that the pipe made of a plastic or a composite material is durably held against the supporting pipe in a pressed manner in order to obtain a secure sealing. Such supporting pipes and connecting arrangements have the disadvantage that, after the sliding-in of the stub of the supporting pipe, a preliminary sealing between the pipe and the stub can be obtained so that a preliminary sealing is achieved even without a pressed connection. However, after a short time, an unintentional leakage may result. This effect is intensified when a receiving device for a sealing ring is arranged on the stub. The sealing ring, after the sliding-in, then provides a sealing with the pipe.

It is therefore an object of the invention to provide a connecting piece for establishing a connecting arrangement which can be pressed together, where forgetting to press the connection together can be recognized immediately in that no sealing exists between the connecting piece and the pipe in the not-pressed-together condition and, when the connection is tested, a fluid or air will leak out. A durable sealing should be achieved only after the pressing-together.

This object is achieved by a connecting piece as well as a corresponding connecting arrangement of the present invention.

According to the invention, at least one radially projecting spacer is provided on the stub, the spacer defining a gap for forming a flow duct between the stub and the pipe. The stub therefore has a slightly smaller circumference, so that a slight gap is provided between the stub and the pipe through which, in the not-pressed-together condition, a fluid or air contained in the pipe can flow out. This immediately indicates that it was forgotten to press the connection together. In this case, the spacer has the function of defining the gap, in which case the connecting piece may also be arranged on the spacer with a certain clamping in order to reach a prefixing of the pipe to the stub. In addition, the stub with the pressable section may be constructed to be essentially circular on the circumference, so that known pressing tools with round cheek plates can be used for the pressing-together. To this extent, the pressing operation does not change for the fitter. In particular, the pressing-together can take place independently of a possible rotation of the connecting piece in the pipe. Also, manufacturing tolerances of the pipe and of the supporting body play a subordinate role for this function.

According to a preferred embodiment, adjacent to the spacer, the stub has a section which can be pressed together and has an essentially ring-shaped cross-section. Thus, when known pressing tools with round cheek plates are used, a uniform contact pressure is obtained in the area of the pressed section. The uniform pressure on the stub permits a minimizing of the stressing of the material on the pipe and the stub.

Preferably, a first spacer is provided on the stub on an end section and a second spacer is provided adjacent to the stop. As a result, the gap formed between the pipe and the stub is fixed on two opposite ends, so that an essentially circular circumference of the stub can be provided in the center in the area to be pressed together. As a result of the two-sided support, when the pipe is inserted with a certain prestressing—thus, when the pipe experiences a slight bending—, a leakiness nevertheless exists as a result of the gap because the pipe is largely fixed along the length of this stub and can experience only very slight bendings. However, the gap is not closed off as a result of such bendings.

The preferred shape of the spacers is such that these have an at least partially ring-shaped construction and have at least one interruption for forming a flow duct between the stub and the pipe. An essentially ring-shaped construction of the spacers permits a truly axial fixing of the stub inside the pipe. However, it is also possible to provide different spacers, such as knobs, strip-shaped enlargements, projections extending longitudinally with respect to the axis of the stub, diagonally extending projections or ribs. It is only required that the spacers fix a gap between the remaining stub and the pipe.

In order to obtain a durable pressed connection secured against displacements, a pressable section is preferably provided on the stub. The section has a plurality of ribs which are circular on the outer circumference. As a result, the material of the pipe can dig into the ribs, and relative movement between the stub and the pipe after the pressing-together is avoided.

According to another embodiment of the invention, a recess for forming a flow duct between the face of the pipe and the stop is provided on the stop of the connecting piece. The intention is that, when the pressing-together has been forgotten and the pipe system is connected, a fluid or air can flow out between the pipe and the stub. An unintentional sealing may even also take place when the pipe rests loosely with its entering edge against a plane stop of the connecting piece. In order to therefore ensure that a premature sealing by the entering edge and the stop of the pipe does not take place even accidentally, at least one recess is preferably provided for forming a flow duct because this recess cannot be closed off even accidentally.

In order to achieve a durable sealing of the pressed-together connecting arrangement, a ring-shaped recess for receiving a sealing ring is preferably provided on the stub. In this case, the connecting piece may be made of metal or of a plastic material.

According to the invention, a connecting arrangement is also provided in which a corresponding connecting piece with a stub is pushed into a pipe. In order to obtain a durable deformation of the stub, a pressure sleeve is preferably provided around the end section of the pipe. The pressure sleeve may be held by a holding ring in a prefixed manner on the connecting piece, so that the pressure sleeve, the holding ring and the connecting piece form a preassembled unit. Instead of a supporting sleeve, the pipe may also be constructed of metal and may be pressed directly onto the stub of the connecting piece.

In the following, the invention will be explained in detail by means of an embodiment with reference to the attached drawings.

BRIEF DESCRIPTION OF THE DRAWINGS

FIG. 2 is an enlarged view of a detail of FIG. 1.

FIG. 3 is a perspective, cross-sectional view of the connecting arrangement of FIG. 1 after the pressing-together.

FIG. 4 is a plane view of the connecting arrangement of FIG. 1.

FIG. 5 is an enlarged view of a detail of FIG. 4.

FIG. 6 is a plane view of the connecting arrangement of FIG. 1 after the pressing-together.

DETAILED DESCRIPTION OF THE PREFERRED EMBODIMENTS

Figure 1:
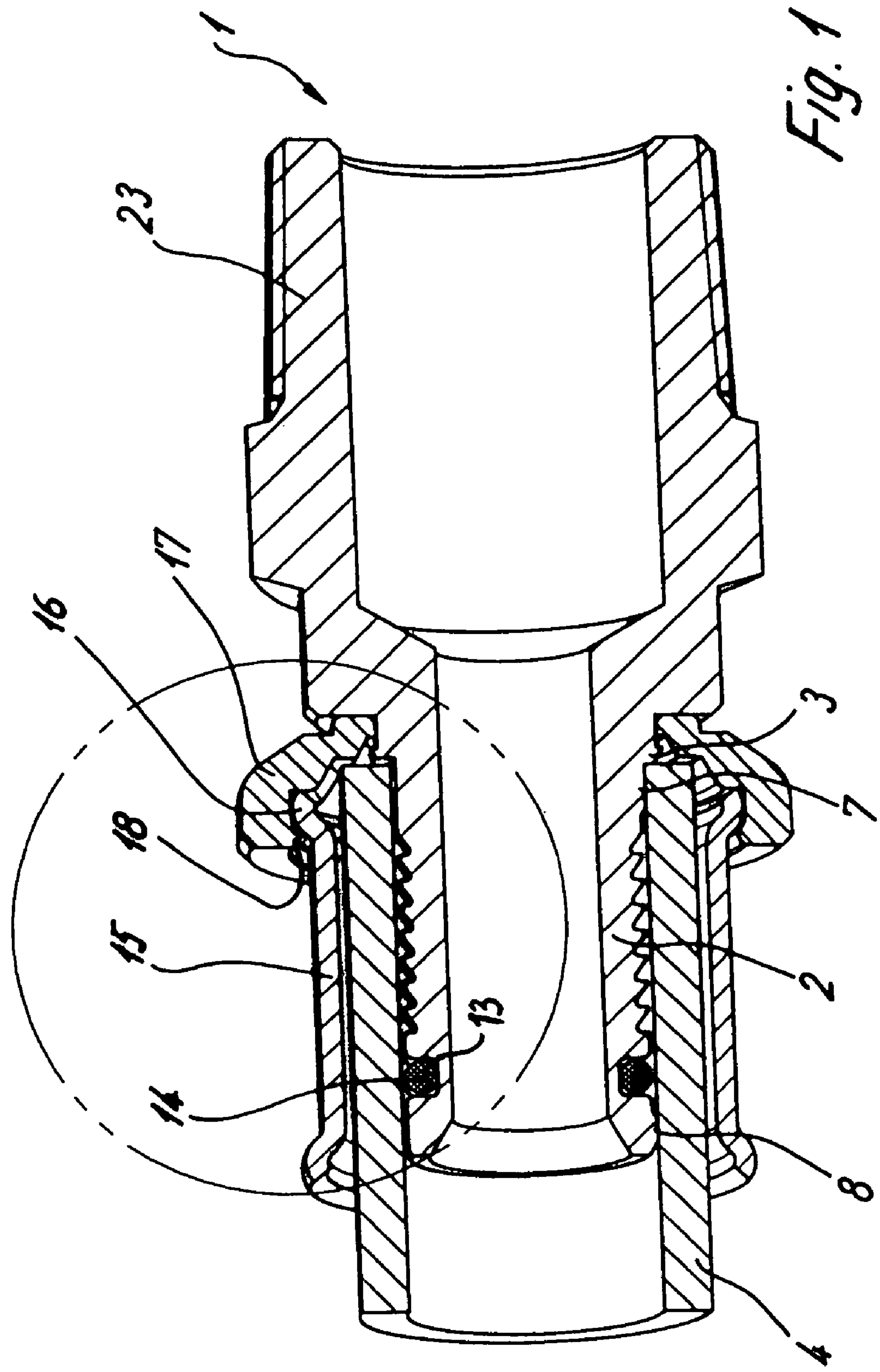
FIG. 1 is a perspective, cross-sectional view of a connecting arrangement according to the invention before the pressing-together.
Figure 7:
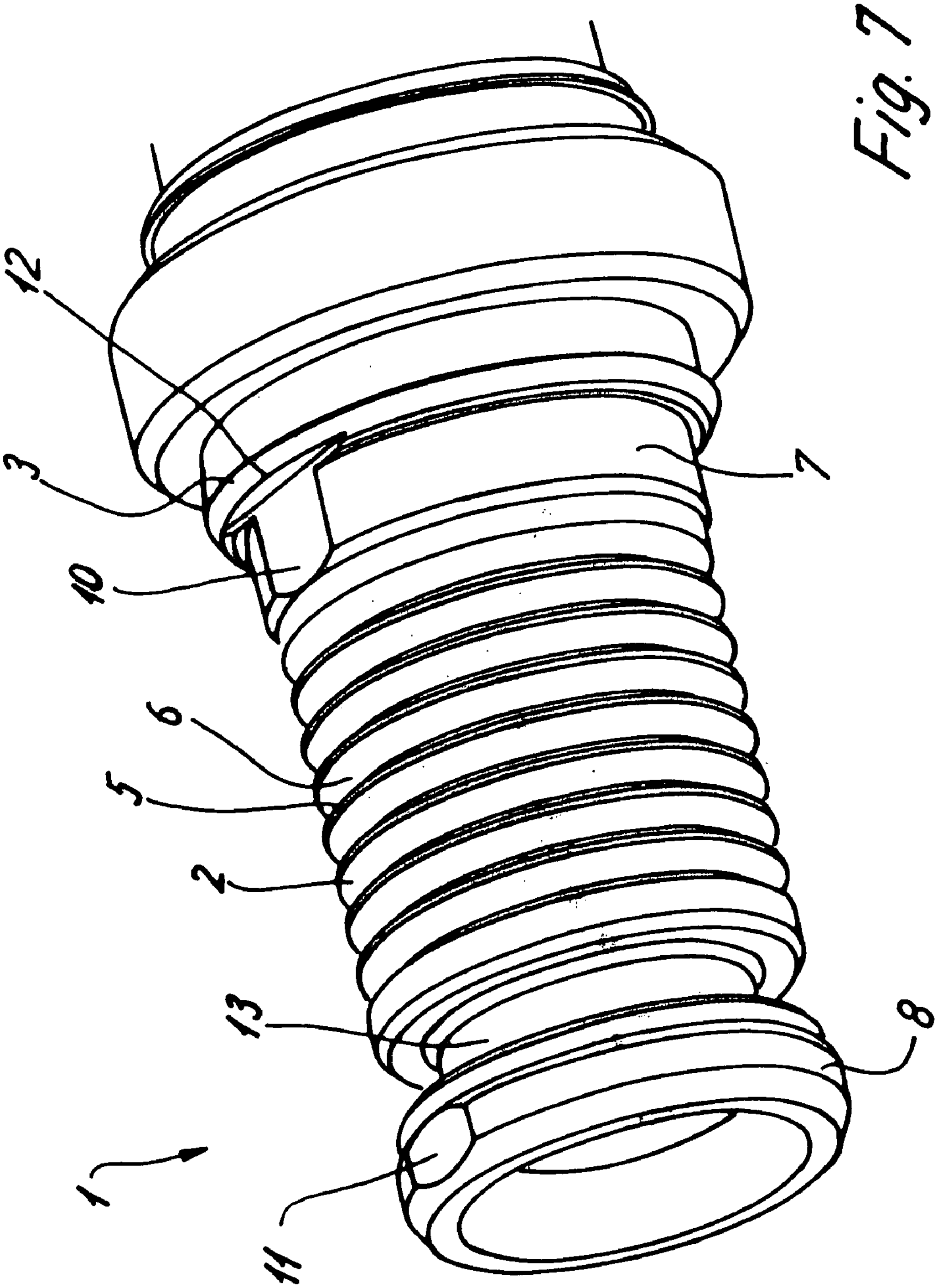
FIG. 7 is a perspective view of a detail of the stub of a supporting pipe according to the invention.

A connecting piece 1 comprises a stub 2 and a connection part 23 which is situated on the opposite side and may be constructed as a fitting or connecting device for connecting another component. The connecting piece 1 may be made of metal or of a plastic material.

The stub 2 can be inserted into a pipe 4 made of a plastic material, of a composite material or of metal. A stop 3 is on the stub 2, to a defined insertion depth of pipe 4. The stub 2 has an essentially ring-shaped cross-section and has profilings in the form of ribs 5 and grooves 6 on its outer circumferential surface, which also have a ring-shaped cross-section.

Spacers 7 and 8, which are also provided on the stub 2, are form-lockingly or with a certain clamping held against an interior wall of the pipe 4. Once spacer 7 is provided adjacent to the stop 3, and one spacer 8 is constructed at the extreme end of the stub 2. As a result of the spacers 7 and 8, the center area of the stub 2 with the profilings 5 and 6 is arranged at a distance or displaced from the pipe 4, so that a gap 9 is formed between the stub 2 and the pipe 4. The gap 9 preferably has a size which is smaller than 1 mm. The spacers may also be situated at different points along the length of the stub 2.

In the illustrated embodiment, the spacers 7 and 8 are formed by ring-shaped projections which have a flattening 10 and 11, respectively, at least at one point. As a result of the ring-shaped construction of the spacers 7 and 8, the stub 2 is concentrically fixed in the pipe 4. In this case, by means of flattenings 10 and 11 in the unpressed condition, fluid can flow from the pipe 4 by way of the gap 9 to the outside. Thus an accidental forgetting of the pressing-together becomes visible. For this purpose, a recess 12 is provided at the stop 3, which recess 12 provides at least at one point that a sealing between the leading edge of the pipe 4 and the stop 3, does not take place accidentally. The recess 12 therefore forms an extension of the gap 9 as a flow duct.

Instead of the flattenings 10, 11 or in addition to them, the spacers 7, 8 may also be provided with a knurling.

In addition, a ring-shaped recess 13 is provided on the stub 2, into which recess 13 a sealing ring 14 is placed. However, in the not-pressed-together condition, the sealing ring 14 is also not in contact with the pipe 4.

For establishing a connecting arrangement which can be pressed together, a pressure sleeve 15 is provided around the pipe 4 in the area of the stub 2. The pressure sleeve 15 has ring-shaped projections 16 extending radially outward. These projections 16 are received by a holding ring 17 which has a section 18 projecting radially inward. The projection 16 and the holding ring 17 can be fixed in the manner of a detent or clamping connection. The holding ring 17, in turn, is fixed to the connecting piece 1. As a result of a stop 22, an interior section 21 of the holding ring 17 can be axially moved only to a limited degree (see FIG. 5). The fixing of the holding ring 17 and of the pressure sleeve 15 takes place by detent or clamping devices, but can also take place by threads or other fastening devices. At least in the illustrated embodiment, the connecting piece 1, the pressure sleeve 15 and the holding ring 17 form a unit which can be preassembled.

For establishing a pressed connection, the pipe 4 is pushed in between the pressure sleeve 15 and the stub 2 of the connecting piece 1 constructed as a supporting pipe. A prefixing of the pipe 4 is achieved by the spacers 7 and 8. Even if the pipe 4 is curved outside the stub 2 and therefore has a certain prestress, the spaced spacers 7 and 8 ensure an alignment of the pipe 4 such that a gap 9 is formed between the pipe 4 and the stub 2. By means of a known pressing tool with round cheek plates, the supporting sleeve 15 can then be pressed onto the pipe 4, and the pipe 4 can be pressed onto the stub 2. As a result, the material of the pipe 4 penetrates into the grooves 6 of the stub 2, and the sealing ring 14 is compressed by the material of the pipe 4, as illustrated in FIGS. 3 and 6. The thus established connecting arrangement ensures a sealing between the stub 2 and the pipe 4 also in the long term.

Pressing points 30 are formed on the pressure sleeve 15 as a result of the pressing-together. In the illustrated embodiment, the pipe 4 is made of a plastic material or of a composite material. It is also conceivable to produce the pipe 4 entirely or partially of metal, a supporting sleeve 15 not being required in that case.

In addition, the stub 2 has ribs 5, grooves 6 as well as a recess 13 for a sealing ring 14 in the illustrated embodiment. It is also conceivable to provide the stub 2 with a smooth construction or with other profilings which, after the pressing-together, are to prevent a slipping of the pipe 4.

Although the present invention has been described and illustrated in detail, it is to be clearly understood that this is done by way of illustration and example only and is not to be taken by way of limitation. The scope of the present invention is to be limited only by the terms of the appended claims.

What is claimed is:

1. A connecting piece, for establishing a connecting arrangement for a pipe, when pressed together the piece comprising:

a stub which can be inserted into a pipe;

profilings on the stub for the pressing-together with the pipe;

a stop on the stub for the pipe;

at least one radially protecting spacer on the stub, the spacer defining a gap forming a flow duct between the stub and the pipe to permit fluid to flow to the outside to provide an indication of a leak; and a pressable section on the stub including the profilings which are circular at the outer circumference.

2. The connecting piece according to claim 1, wherein the stub has, adjacent to the spacer, a pressable section which has an essentially ring-shaped cross-section and whose diameter is slightly reduced with respect to the spacer.

3. The connecting piece according to claim 1, wherein the spacer includes a first spacer and an end section of the stub, and a second spacer adjacent to the stop on the stub.

4. The connecting piece according to claim 1, wherein one or more spacers are provided on the stub.

5. The connecting piece according to claim 1, wherein the spacer is at least partially ring-shaped and has at least one interruption forming a portion of the flow duct between the stub and the pipe.

6. The connecting piece according to claim 1, wherein the spacer is knurled at its outside diameter.

7. The connecting piece according to claim 1, including a pressure sleeve around and spaced from the stub for receiving the pipe therebetween.

8. A connecting piece, for establishing a connecting arrangement for a pipe, when pressed together, the piece comprising:

a stub which can be inserted into a pipe;

profilings on the stub for the pressing-together with the pipe;

a stop on the stub for the pipe;

at least one radially projecting spacer on the stub, the spacer defining a gap forming a flow duct between the stub and the pipe; and including a recess on the stop forming a portion of the flow duct between the face of the pipe and the stop.

9. A connecting piece for establishing a connecting arrangement for a pipe, when pressed together, the piece comprising:

a stub which can be inserted into a pipe;

profilings on the stub for the pressing-together with the pipe;

a stop on the stub for the pipe;

at least one radially projecting spacer on the stub, the spacer defining a gap forming a flow duct between the stub and the pipe;

wherein the stub has, adjacent to the spacer, a pressable section which has an essentially ring-shaped cross-section and whose diameter is slightly reduced with respect to the spacer; and wherein the pressable section includes the profilings which are circular at the outer circumference.

10. A connecting piece for establishing a connecting arrangement for a pipe, when pressed together the piece comprising:

a stub which can be inserted into a pipe;

profilings on the stub for the pressing-together with the pipe;

a stop on the stub for the pipe;

at least one radially projecting spacer on the stub, the spacer defining a gap forming a flow duct between the stub and the pipe;

wherein the spacer is at least partially ring-shaped and has at least one interruption forming a portion of the flow duct between the stub and the pipe; and including a recess on the stop forming a portion of the flow duct between the face of the pipe and the stop.

11. A connecting piece for establishing a connecting arrangement for a pipe, when pressed together, the piece comprising:

a stub which can be inserted into a pipe;

profilings on the stub for the pressing-together with the pipe;

a stop on the stub for the pipe;

at least one radially projecting spacer on the stub, the spacer defining a gap forming a flow duct between the stub and the pipe to permit fluid to flow to the outside to provide an indication of a leak;

wherein the stub has, adjacent to the spacer, a pressable section which has an essentially ring-shaped cross-section and whose diameter is slightly reduced with respect to the to the spacer; and including a holding ring retaining the pressure sleeve on the connecting piece.

* * * * *